(12) United States Patent
Terada et al.

(10) Patent No.: US 7,105,751 B2
(45) Date of Patent: Sep. 12, 2006

(54) CALIBRATION ASSISTING METHOD, DEVICE AND SYSTEM

(75) Inventors: Masayuki Terada, Shizuoka (JP); Michiharu Matsuda, Tokyo (JP); Atsushi Kobayashi, Tokyo (JP); Kazunori Uemori, Tokyo (JP)

(73) Assignee: Yazaki Corporation, Tokyo (JP)

( * ) Notice: Subject to any disclaimer, the term of this patent is extended or adjusted under 35 U.S.C. 154(b) by 155 days.

(21) Appl. No.: 10/847,291

(22) Filed: May 18, 2004

(65) Prior Publication Data

US 2005/0261852 A1    Nov. 24, 2005

(51) Int. Cl.
*G01G 19/22* (2006.01)

(52) U.S. Cl. .................. 177/25.13; 702/101; 702/102; 177/25.13; 177/50; 177/136; 73/1.13

(58) Field of Classification Search .................. 177/50, 177/145, 146, 25.13, 136, 137–141; 73/1.13; 702/101–102
See application file for complete search history.

(56) References Cited

U.S. PATENT DOCUMENTS 4,048,843 A * 9/1977 Dunbar ........................ 73/1.13
5,410,109 A * 4/1995 Tarter et al. ................. 177/136

FOREIGN PATENT DOCUMENTS

JP    2001-228015    8/2001

* cited by examiner

*Primary Examiner*—David M. Gray
*Assistant Examiner*—Sean Kayes
(74) *Attorney, Agent, or Firm*—Armstrong, Kratz, Quintos, Hanson & Brooks, LLP (57) ABSTRACT

A calibration assisting device includes a reference load data storage means $30d$ for storing, as a reference load data, the reference load data produced from load sensor 10 when a desired reduced quantity is generated in a vehicle weight measuring device 40, a load data fetching means $30a1$ for fetching the load data produced from the load sensor 10, a tire load data fetching means $30a2$ for fetching a tire load data produced from the vehicle weight measuring device 40, a reduced quantity detecting means $30a3$ for detecting a reduced quantity on the basis of the tire load data thus fetched, a calibration information creating means $30a4$ for creating calibration information on the basis of the load data fetched by the load data fetching means $30a1$ corresponding to the tire load data and the reference load data stored in the reference load data storage means $30d$ when the reduced quantity is detected, and a calibration information outputting means $30a5$ for outputting the calibration information produced from the calibration information creating means $30a4$. In such a configuration, the calibration assisting device can assist the calibration of the weight meter.

4 Claims, 7 Drawing Sheets

CALIBRATION ASSISTING METHOD, DEVICE AND SYSTEM

BACKGROUND OF THE INVENTION

1. Field of the Invention

This invention relates to a calibration assisting method, device and system, and more particularly to a calibration assisting method, device and system for assisting the calibration of a weight meter for measuring the loaded weight of a vehicle produced from a load sensor. The load data varies according to a distortion of an axle, which is generated when the load applied to the vehicle is conducted to the axle.

2. Description of the Related Art

The measurement of the weight loaded on a vehicle is carried out, for a large vehicle such as a truck, in order to prevent a traffic accident such as turnover on the side of the vehicle due to overloading and promotion of vehicle deterioration. Conventionally, measurement of loaded weight of the vehicle was carried out in such a manner that the vehicle is placed on a platform scale. This manner requires large-scale facilities and a large installing space. Therefore, the number of the platform scales, which can be set, is limited and hence the measurement cannot be carried out for a large number of vehicles. In addition, the production cost is also increased.

In order to obviate these inconveniences, in recent years, a weight meter has been proposed in which it is mounted on the vehicle itself to measure the loaded weight. In a conventional weight sensor mounted on the vehicle, sensors for weight measurement, e.g. strain gage sensors are attached to both left and right ends of each of both front and rear axles. The loaded weight is measured on the basis of the sum of the outputs of the respective sensors, which are proportional to the loads applied to the front/rear and left/right tires.

In the weight meter, in order to maintain the measurement accuracy, the relationship between the outputs from the sensors and an actual weight of the matter to be measured is investigated, and on the basis of the investigation result, a sensor signal is calibrated. There is the following known calibrating method.

For example, with a weight loaded on a stand installed on the upper portion of a container, calibration is carried out. In this case, a specific structure is required to fix the stand to the container. In addition, since excessive load is applied from the upper portion of the container, the container may break. The labor of placing a large number of weight members placed at a height of 2 meter or higher is enormous and entails danger.

The method for calibrating the weight meter safely and easily is disclosed in JP-A-2001-228015. In accordance with this method, the weight meter can be calibrated safely and easily in such a manner that a plurality of spring members are hung from the container for accommodating a matter to be conveyed, a weight member having a prescribed weight is placed on a stand supported by the spring member and the relationship between the output of the load cell sandwiched between the container and the body frame of the vehicle and the weight of the weight member is examined.

However, since the above calibration method is carried out using the weight member, time and labor are required to load/unload the weight member so that the weight meter cannot be calibrated for a short time. A structure must be provided for supporting the above stand with respect to the container, vehicle, etc.

SUMMARY OF THE INVENTION

An object of the present invention is to provide a calibration assisting method, device and system for assisting the calibration of a weight meter in a short time.

In order to attain the above object, there is provided a calibration assisting method for assisting the calibration of a weight meter for measuring the loaded weight of a vehicle on the basis of a load data, the weight meter measuring the loaded weight of a vehicle, the load data varying according to a distortion of an axle generated when the load applied to the vehicle is conducted to the axle, comprising the steps of:

detecting a desired reduced quantity of a vehicle weight in a vehicle weight measuring device for measuring a vehicle weight of the vehicle which is conducted through tires of the vehicle;

extracting the load data produced from the load sensor when the desired reduced quantity is detected; and creating calibration information on the basis of the extracted load data and the reference load data produced from the load sensor when the desired reduced quantity is generated; and outputting the calibration information for assisting.

In accordance with the calibration assisting method described above, when the desired reduced quantity of the vehicle weight in the vehicle weight measuring device is detected, the load data produced from the load sensor corresponding to the desired reduced quantity thus detected is extracted. On the basis of the load data thus extracted and the reference load data, the calibration information is created and outputted. Therefore, with the reference load data of the load sensor corresponding to the desired reduced quantity in the vehicle weight measuring device having been prepared, when the desired reduced quantity in the vehicle weight measuring device is detected, on the basis of the load data produced from the load sensor and the corresponding reference load data, the calibration information for assisting the calibration of the weight meter is created. The operator reduces the vehicle weight conducted through the tire placed on the vehicle weight measuring device using a jack, crane, etc. Then, a distortion on the axle is produced opposite to the distortion of the axle when the load applied to the vehicle is conducted to the axle. Therefore, the calibration information for the weight meter based on the distortion can be obtained. Thus, since it is not necessary to employ a weight member when calibrating the weight meter, the calibration for the weight meter can be carried out in a short time, and the structure on which the weight member is placed is not required.

Figure 1:
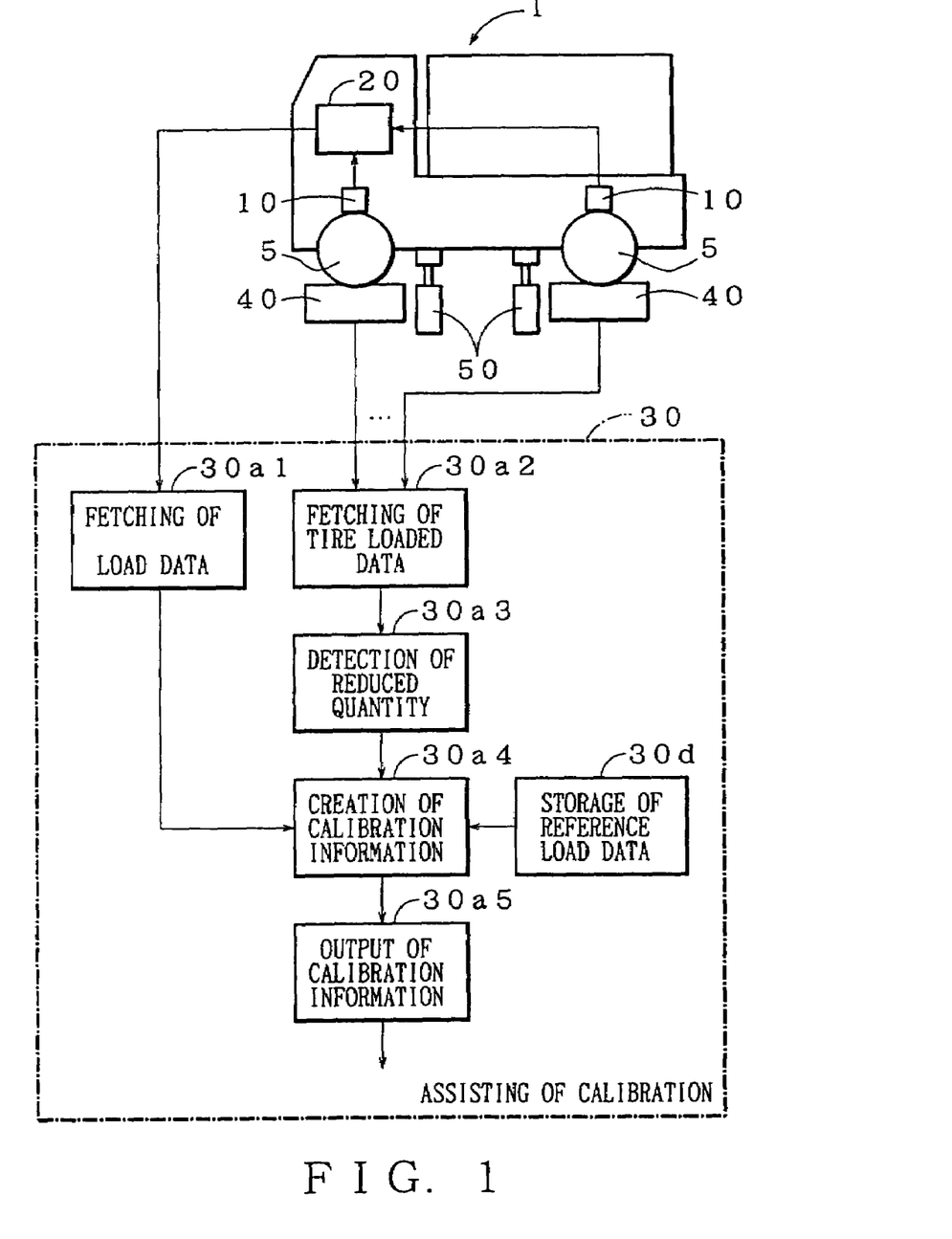
FIG. 1 is a view showing the basic configuration of the calibration assisting device and calibration assisting system according to the present invention.

In accordance with the present invention, as understood from the basic configuration as shown in FIG. 1, there is also provided a calibration assisting device for assisting the calibration of a weight meter 20 for measuring the loaded weight of a vehicle 1 on the basis of a load data produced from a load sensor 10, the weight meter measuring the loaded weight of a vehicle, the load data varying according to a distortion of an axle generated when the load applied to the vehicle is conducted to the axle, comprising:

a reference load data storage means 30d for storing reference load data produced from the load sensor 10 when a desired reduced quantity of a vehicle weight is generated in a vehicle weight measuring device for measuring a vehicle weight which is conducted through tires 5 of the vehicle;

a load data fetching means 30a1 for fetching the load data produced from the load sensor 10;

a tire load data fetching means 30a2 for fetching tire loaded data produced from the vehicle weight measuring device 40;

a reduced quantity detecting means 30a3 for detecting the desired reduced quantity of the vehicle weight;

a calibration information creating means 30a4 for creating information to assist the calibration on the basis of the load data corresponding to the tire load data and the reference load data stored in the reference load data storage means 30a2 when the desired reduced quantity is detected by the reduced quantity detecting means 30a3; and a calibration information outputting means 30a5 for outputting the calibration information created by the calibration information creating means 30a4.

In accordance with the calibration assisting device described above, when the desired reduced quantity of the vehicle weight is detected on the basis of the tire loaded data fetched by the tire loaded data fetching means 30a2 is detected by the reduced quantity detecting means 30a3, the load data corresponding to the desired reduced quantity thus detected is extracted by the load data fetching means 30a1. On the basis of the load data thus extracted and the reference load data stored in the reference load data storage means 30d, the calibration information is created by the calibration information creating means 30a4. The calibration information thus created is outputted by the calibration information outputting means 30a5. Therefore, with the reference load data of the load sensor corresponding to the desired reduced quantity in the vehicle weight measuring device 40 having been prepared, when a desired reduced quantity is detected on the basis of the tire loaded data fetched from the vehicle weight measuring device 40, on the basis of the load data produced from the load sensor and the corresponding reference load data, the calibration information for assisting the calibration of the weight meter is created. The operator reduces the vehicle weight conducted through the tire placed on the vehicle weight measuring device 40 using a jack, crane, etc. Then, a distortion on the axle is produced opposite to the distortion of the axle when the load applied to the vehicle is conducted to the axle. Therefore, the calibration information for the weight meter based on the distortion can be obtained. Thus, since it is not necessary to employ a weight when calibrating the weight meter, the calibration for the weight meter can be carried out in a short time, and the structure on which the weight is placed is not required.

Figure 2:
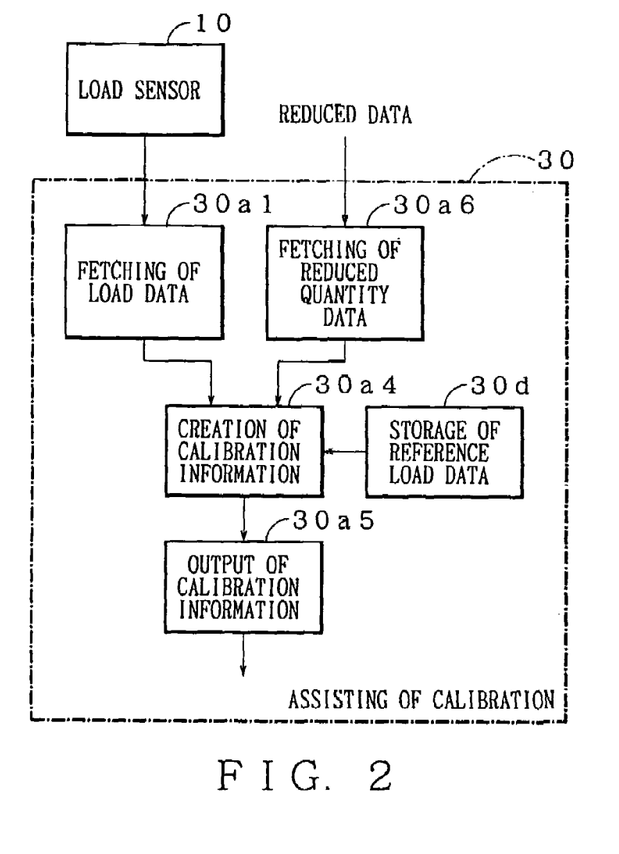
FIG. 2 is a view showing the other basic configuration of the calibration assisting device according to the present invention.

In accordance with the present invention, as seen from the basic configuration shown in FIG. 2, there is also provided a calibration assisting device for assisting the calibration of a weight meter 20 for measuring the loaded weight of a vehicle 1 on the basis of a load data produced from a load sensor 10, the weight meter measuring the loaded weight of a vehicle, the load data varying according to a distortion of an axle generated when the load applied to the vehicle is conducted to the axle, comprising:

a reference load data storage means 30d for storing a reference load data produced from the load sensor when a desired reduced quantity of a vehicle weight is generated in a vehicle weight measuring device 40 for measuring a vehicle weight which is conducted through tires of the vehicle;

a load data fetching means 30a1 for fetching the load data produced from the load sensor 10;

a reduced quantity data fetching means 30a6 for fetching a reduced quantity data indicative of the desired reduced quantity produced by the vehicle weight measuring device 40;

a calibration information creating means 30a4 for creating the calibration information on the basis of the load data fetched by the load data fetching means 30a1 corresponding to the reduced quantity data fetched by the reduced quantity fetching means 30a6 and the reference load data stored in the reference load data storage means 30d corresponding to the desired reduced quantity; and a calibration information outputting means 30a5 for outputting the calibration information created by the calibration information creating means 30a4.

In accordance with the calibration assisting device described above, when the reduced quantity data is fetched by the reduced quantity data fetching means 30a6, on the basis of the corresponding load data fetched by the load data fetching means 30a1 and the corresponding reference load data stored in the reference load data storage means 30d, the calibration information is created by the calibration information creating means 30a4, and the calibration information thus created is outputted by the calibration information outputting means 30a5. Therefore, with the reference load data of the sensor unit (load sensor) 10 corresponding to the desired reduced quantity in the mat scale (vehicle weight measuring device) 40 being stored in the storage device 30d, when the desired reduced quantity produced in the vehicle weight measuring device 40 is fetched into the calibration assisting device 30, on the basis of the load data produced from the load sensor and the corresponding reference load data, the calibration assisting device 30 creates the calibration information for assisting the calibration of the weight meter 20. The operator reduces the vehicle weight conducted through the tire 5 placed on the vehicle weight measuring device using the jack, crane, etc. Then, a distortion on the axle 2 is produced opposite to the distortion of the axle 2 when the load applied to the vehicle is conducted to the axle 2. Therefore, the calibration information for the weight meter 20 based on the distortion can be obtained. Thus, since it is not necessary to employ a weight when calibrating the weight meter 20, the calibration for the weight meter can be carried out in a short time.

In accordance with the present invention, as seen from the basic configuration shown in FIG. 1, there is provided a calibration assisting system comprising:

the calibration assisting device according to claim 2; the vehicle weight measuring device 40; and vehicle weight reducing means 50 for reducing the vehicle weight which is conducted from the tires 5 placed on the vehicle weight measuring means 40 to the vehicle weight measuring means 50, wherein the reduced quantity detecting means 30a3 of the calibration assisting device 30 detects the desired quantity generated by the vehicle weight measuring device 50.

In accordance with the calibration assisting system described above, the vehicle weight conducted from the tire 5 placed on the vehicle weight measuring devices 40 to the vehicle weight measuring device 40 is reduced by the vehicle weight reducing means 50. When it is detected by the calibration assisting device 30 that the vehicle weight has become a desired reduced quantity, on the basis of the corresponding load data fetched and the corresponding reference load data, the calibration information is created and outputted for assisting. Therefore, with the tires 5 of the vehicle being placed on the vehicle weight measuring devices 40, by reducing the vehicle weight conducted to the vehicle weight measuring device to a desired reduced quantity using the vehicle weight reducing means 50, the calibration assisting device 30 creates the calibration information. Without requiring the structure for placing the weight on the vehicle, the operator can easily obtain the calibration information. Further, the facility configuration can be simplified as compared with the conventional facility using the weight. In this way, in accordance with the calibration assisting system the present invention, the calibration can be carried out at low cost in a short time. Since the calibration assisting device can be adopted by the customer for which the measuring accuracy of the weight meter 20 is not required so highly, the safety of the vehicle on which the weight meter is mounted can be further improved.

The above and other objects and features of the invention will be more apparent from the following description taken in conjunction with the accompanying drawings.

DESCRIPTION OF THE PREFERRED EMBODIMENTS

Figure 3:
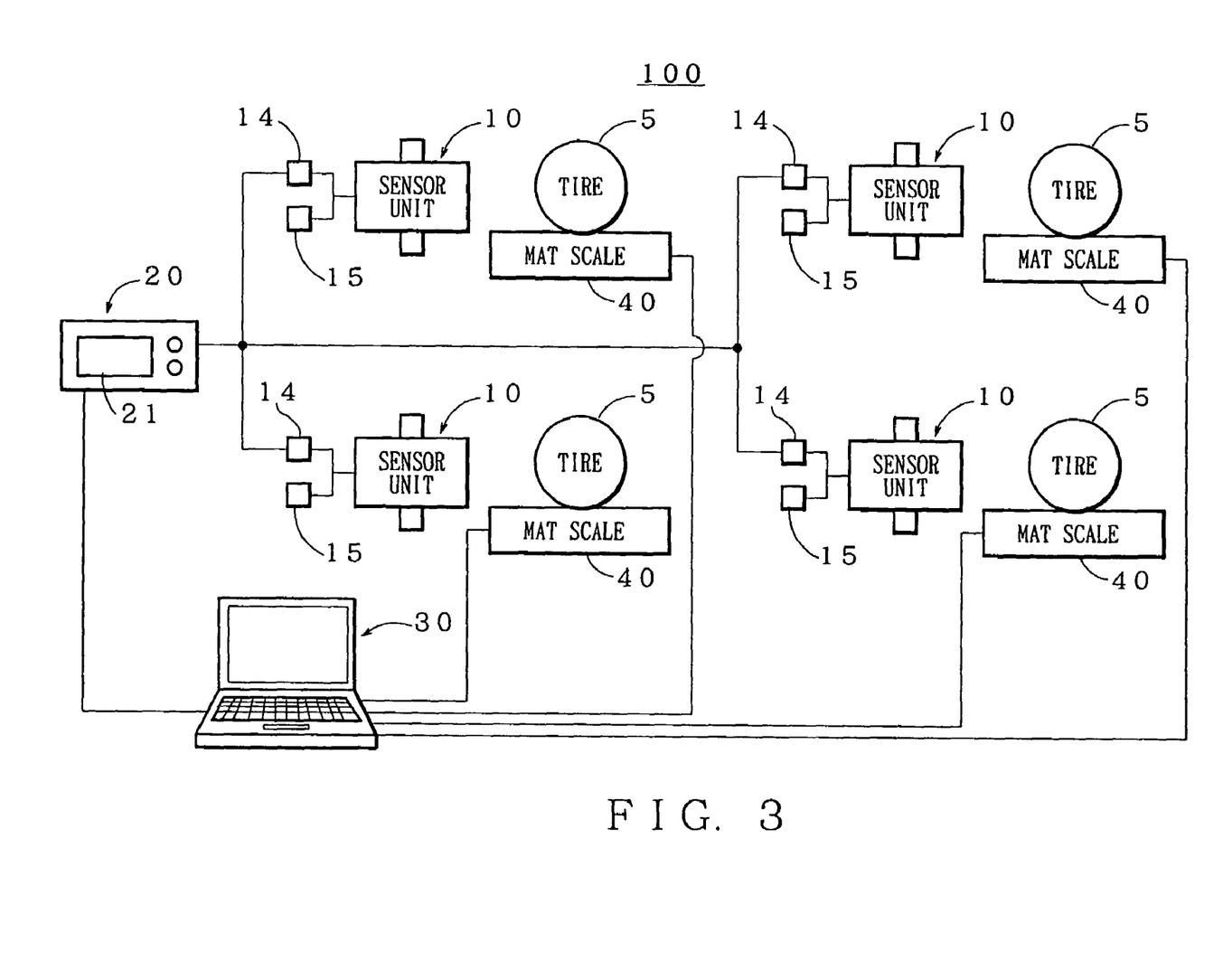
FIG. 3 is an exemplary outline of the calibration assisting device according to the present invention.
Figure 4:
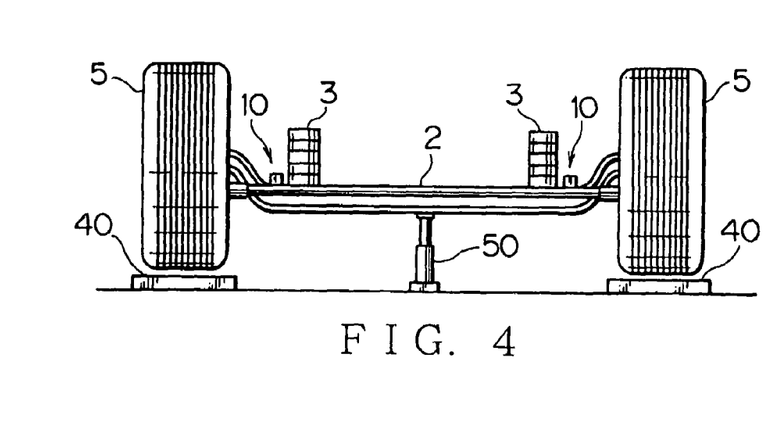
FIG. 4 is a conceptual view for explaining the manner of using a jack.
Figure 5:
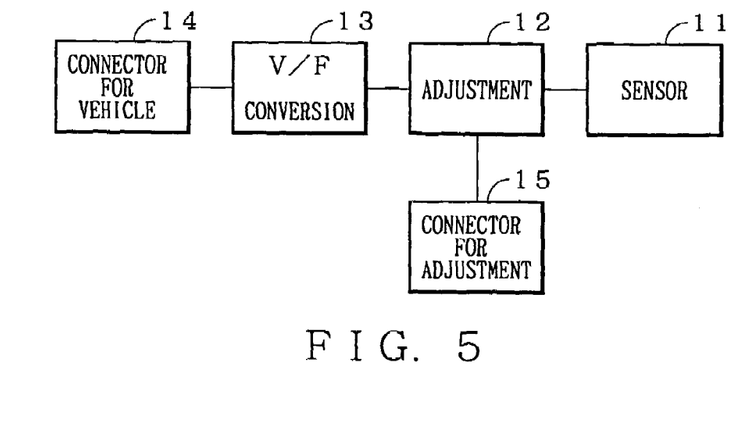
FIG. 5 is a view of the structure of a sensor unit shown in FIG. 3.
Figure 6:
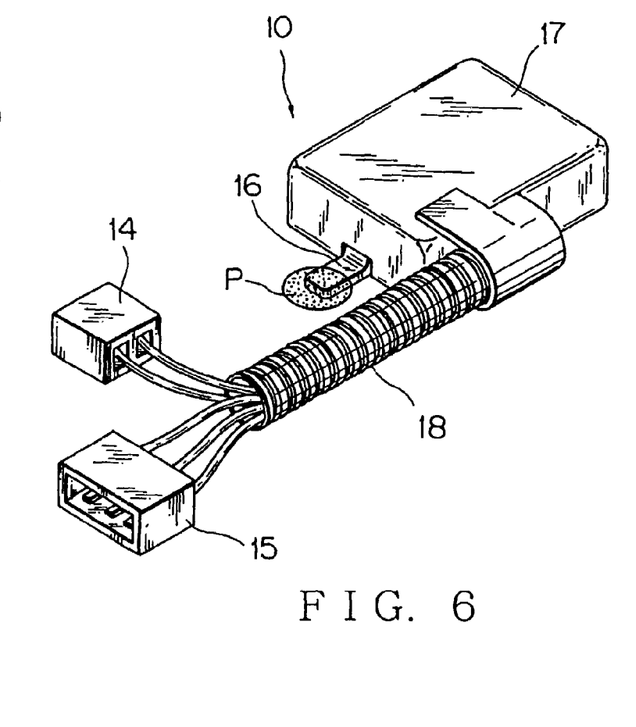
FIG. 6 is a perspective view of the appearance of the sensor unit shown in FIG. 3.
Figure 7:
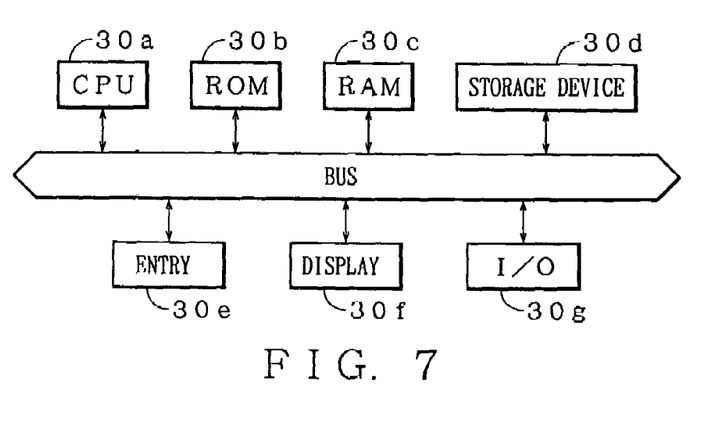
FIG. 7 is a view showing a schematic configuration of the calibration assisting device shown in FIG. 3.
Figure 8:
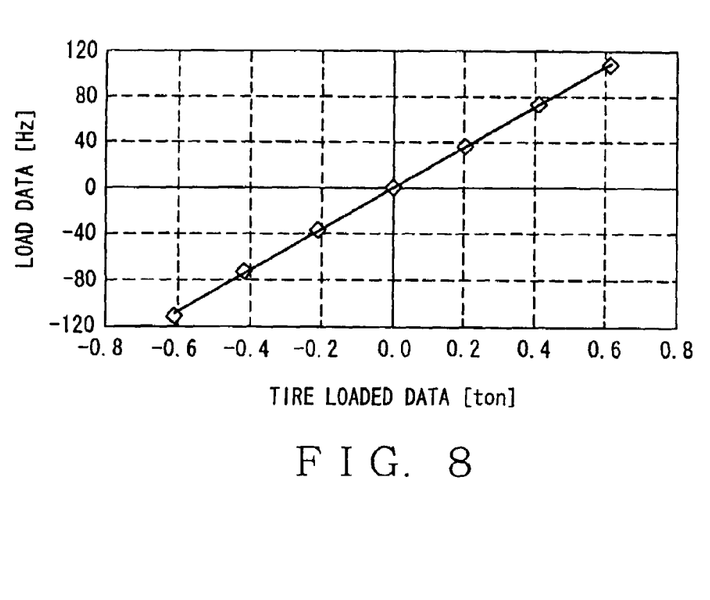
FIG. 8 is a graph showing the relationship between a load data and a tire load data.
Figure 9:
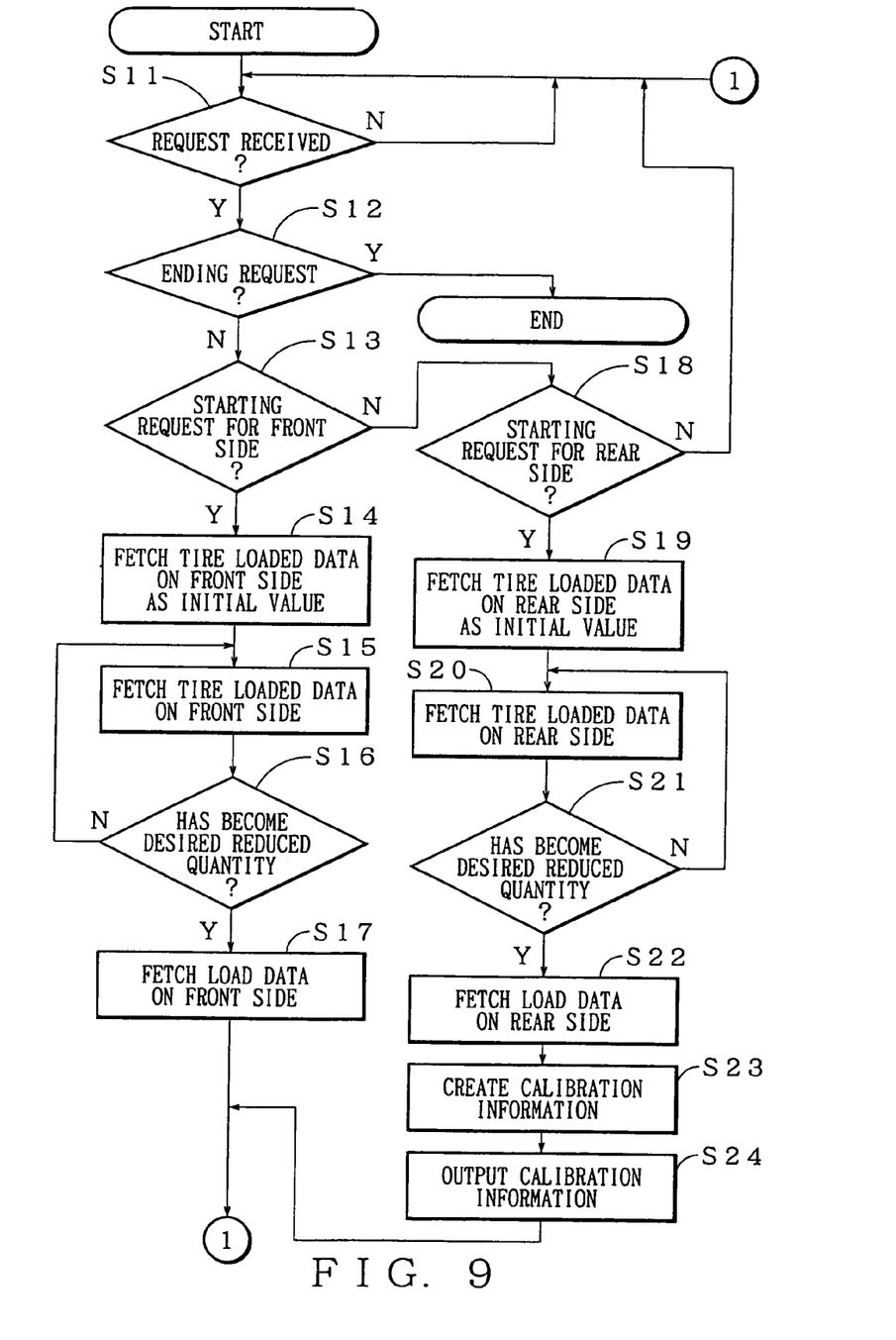
FIG. 9 is a flowchart showing a processing outline in the first embodiment performed by CPU.
Figure 10:
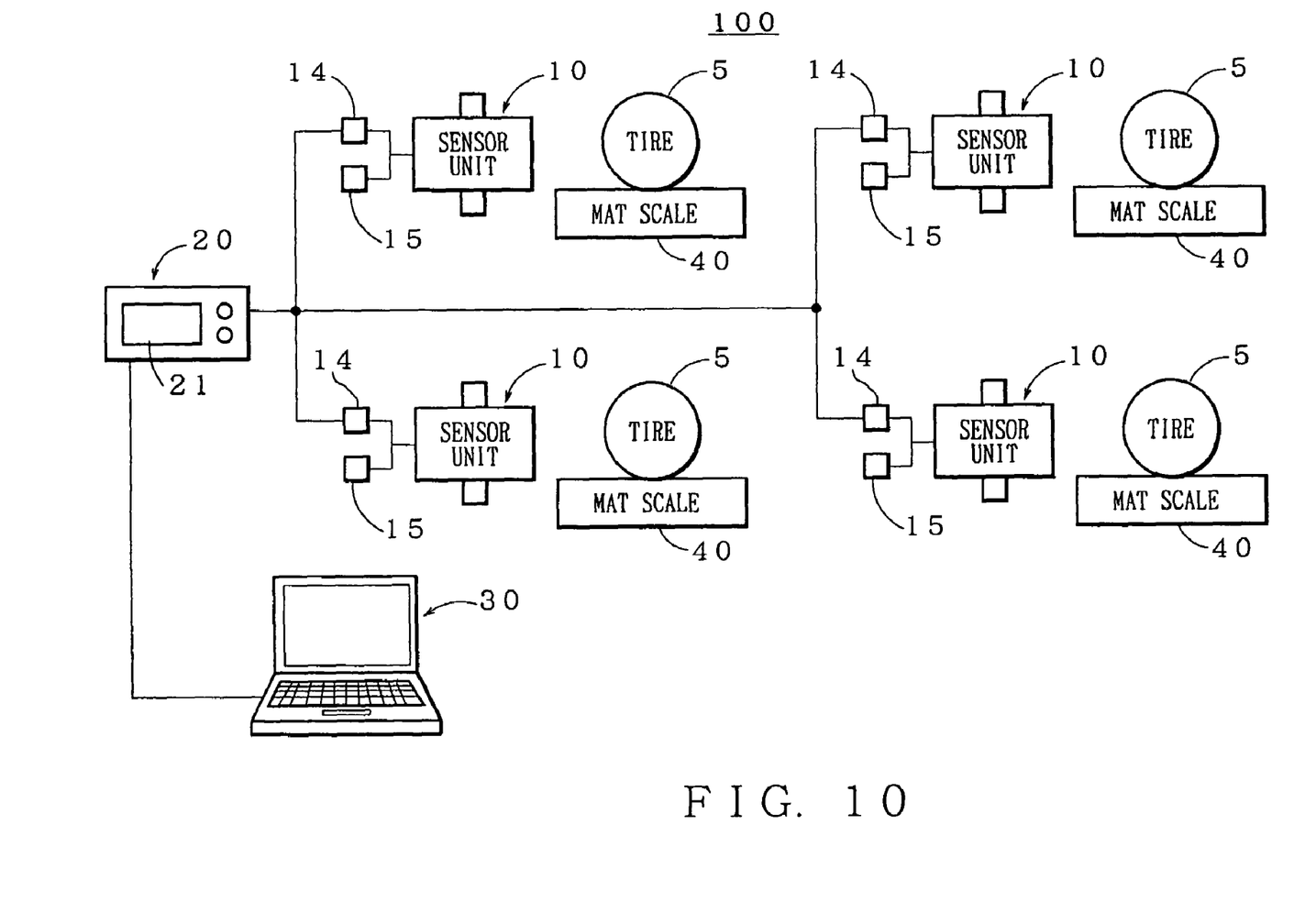
FIG. 10 is a view showing an outline of the calibration assisting system in the second embodiment.
Figure 11:
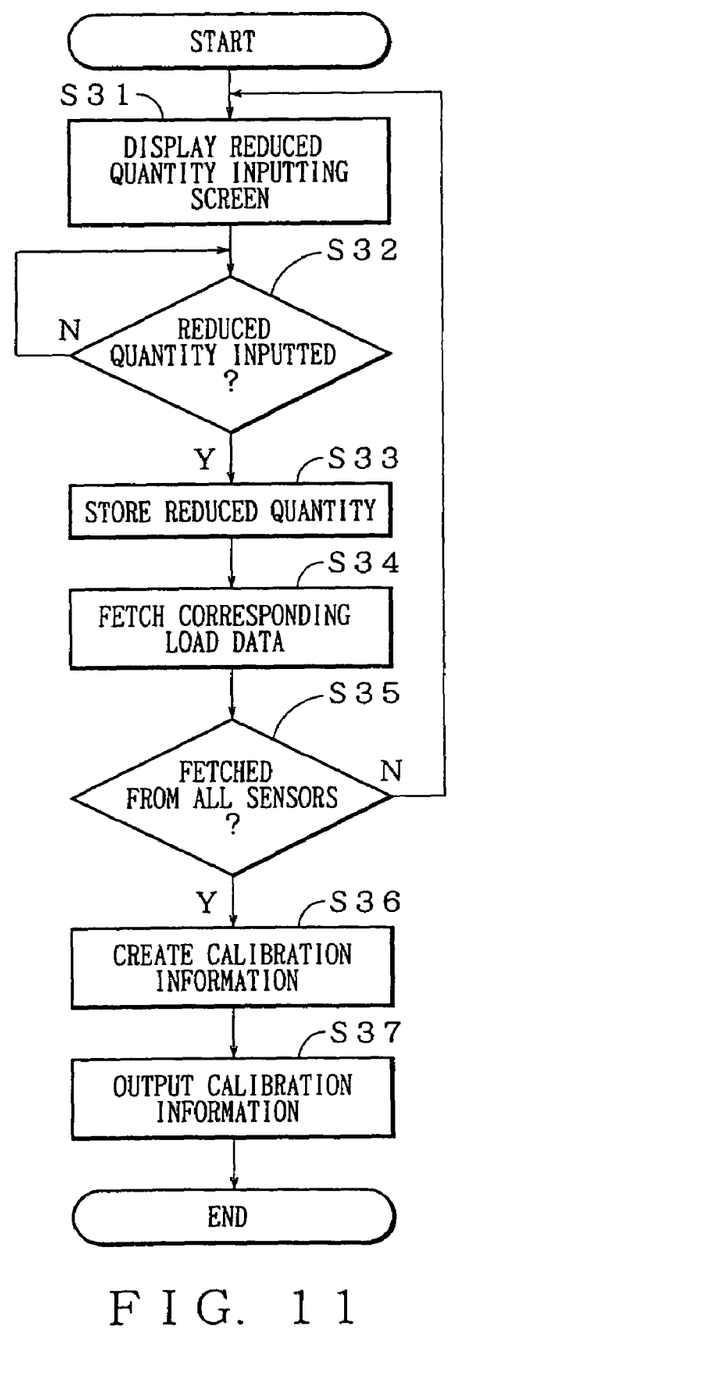
FIG. 11 is a flowchart of the outline of the processing performed by CPU in the calibration assisting device shown in FIG. 10.

Now referring to FIGS. 3 to 11, an explanation will be given of an embodiment of a sensor unit and a calibration assisting system according to the present invention. FIG. 3 is an exemplary outline of the calibration assisting device according to the present invention; FIG. 4 is a conceptual view for explaining the manner of using a jack; FIG. 5 is a view of the structure of a sensor unit shown in FIG. 3; FIG. 6 is a perspective view of the appearance of the sensor unit shown in FIG. 3; FIG. 7 is a view showing a schematic configuration of the calibration assisting device shown in FIG. 3; FIG. 8 is a graph showing the relationship between a load data and a tire load data; FIG. 9 is a flowchart showing a processing outline in the first embodiment performed by CPU; FIG. 10 is a view showing an outline of the calibration assisting system in the second embodiment; and FIG. 11 is a flowchart of the outline of the processing performed by CPU in the calibration assisting device shown in FIG. 10.

Embodiment 1

In FIGS. 3 and 4, a calibration assisting system 100, generally includes a plurality of sensor units 10 which are deposited on axles 2 in the vicinity of the tires 5 at both left and right ends of both axles of the front/rear of a vehicle; a weight meter 20 which is placed on the vehicle and displays the loaded weight of the vehicle measured on the basis of load signals from the plurality of sensor units 10; a calibration assisting device 30 for assisting the calibration of the weight meter 20; a plurality of mat scales (corresponding to vehicle weight measuring devices) for measuring the load applied to the tire 5 of the vehicle to produce the vehicle weight data corresponding to the vehicle weight; and a jack (vehicle weight reducing means) for lifting up the tires 5 of the vehicle from the mat scales 40.

This embodiment is directed to a four wheel vehicle so that the four sensor units 10 constitute the calibration assisting system 100. The present invention should not be limited to such a configuration, but may be realized in various configurations such as six sensor units for a six wheel vehicle.

As shown in FIG. 4, arc leaf springs 3 are placed between the left and right ends of both front and rear axles 2 of the vehicle and front, rear, left and right positions of a load-carrying platform frame, respectively. Each of the sensor units 10 fused to both front and rear axles 2 produces a load signal corresponding to the distortion of the axle 2 which is generated when the load applied to the vehicle is conducted to the axle 2 through the leaf spring 3.

The sensor unit 10 includes a distortion sensor 11 for producing a load signal corresponding to a distortion of the axle, an adjusting unit 12 for performing the amplification and correction of the load signal produced by the sensor 11, a voltage/frequency conversion unit (hereinafter referred to as V/F conversion unit) for converting the load signal adjusted by the adjusting unit 12 into a frequency; a connector 14 connected to the weight meter for transmitting the load signal converted into the frequency by the V/F conversion unit 13; and a setting connector 15 enabling connection to a setting device (not shown).

The adjusting unit 12 may be an ASIC (application specific integrated circuit) including an A/D conversion unit for converting a load signal supplied from the sensor 11 into a digital load signal, a correction unit for correcting the digital load, and a D/A conversion unit for converting the digital load signal into an analog load signal. Incidentally, in this embodiment, although the adjusting unit 12 was realized by the ASIC, the present invention should not be limited to the ASIC, but may be realized in various configurations such as DSP and CPU.

As shown in FIG. 6, the sensor unit 10 constitutes a unit body in which a metallic protecting cover 17 is combined with a metallic base assembly 16 to which the sensor is fixed so that the metallic cover 17 covers the sensor 11. Both ends of the base assembly 16 are fusing portions and projected from the protecting cover 17 when the base assembly 16 is combined with the protecting cover 17. The sensor unit is attached to the axle by welding each of both ends of the base assembly 16 to the fusing position of the axle.

A corrugated tube 18 projects from the protecting cover 17 of the sensor 10. Cables each provided with the weight meter connector 14 and the adjusting connector 15 are passed through the corrugated tube 18. The weight meter connector 14 is connected to the weight meter 20, whereas the setting connector 15 is connected to a setting device.

The calibration assisting device 30 provided on the exterior of the vehicle may be a personal computer which operates according to a prescribed program, and is adapted so that it can be connected to the weight meter 20, a scale 40, etc.

As shown in FIG. 7, the calibration assisting device 30 has a central processing unit (CPU) 30a for controlling the operation of the entire device according to a prescribed program. The CPU 30 is connected, through a bus B, to a ROM (Read-Only-Memory) which stores a program for the CPU 30a and a RAM 30c which stores various data and various areas necessary for the processing in the CPU 30a.

The CPU 30a is connected through the bus B to a storage device 30d which may be a hard disk device. The storage device 30d stores various files such as a calibration assisting program file installed from CD-ROM so that the personal computer serves as a calibration assisting device 30.

In this embodiment, various files such as a program are installed in a main storage device 60d from a CD-ROM, which can be read by the personal computer 50. The present invention should not be limited to such a configuration but can be realized in various configurations in which the various files can be downloaded from an internet or telephone line through a communication interface.

The CPU 30a is connected to an entry unit 30e having an interface through the bus B. The entry unit 30e corresponds to a keyboard or mouth. Various input data inputted from the entry unit 30e are supplied to the CPU 30a through the bus B.

The bus B is connected to a display unit 30f, which may be a liquid crystal display. The display unit 30f displays the display contents on the basis of the CPU 30a.

The bus B is also connected to an input/output unit (I/O unit). The input/output unit 30g is connected to the weight meter 20 and a plurality of mat scales 40. The load data produced by the weight meter 20 and tire load data produced by the mat scales 40 are supplied to the CPU 30a through the I/O unit 30g. The calibration information for calibrating the adjusting unit 12 of the sensor unit 10, which has been created by the CPU 30a, is supplied to the sensor unit 10 through the I/O unit 30g.

When the tire 5 is placed on the mat scale 40 for measurement, the vehicle weight conducted through the tire is produced as the tire load data. In this embodiment, although four mat scales 40 are employed, two mat scales 40 may be employed to make the measurement for each of the front and rear axles. Otherwise, a single mat scale may be employed to make successive measurements for the tires.

The jack 50 is arranged beneath the vehicle as shown in FIG. 4, and employed to lift up the tire 5 placed on the corresponding mat scale 40. In this embodiment, the jack 50 is employed to jack up the tire 5 corresponding to the sensor unit 10 to be calibrated so that the measurement result by the mat scale 40 is reduced by a prescribed load.

An explanation will be given of an example of the information stored in the storage device 30d of the calibration assisting device 30. The storage device 30d stores various files such as a calibration assisting program file, a table file used by the calibration assisting program file, etc.

The calibration assisting program contained in the calibration assisting program serves to assist the computer to function as a calibration assisting device 30 for assisting the calibration of a weight meter 20 for measuring the loaded weight of a vehicle produced from a load sensor on the basis of the load data varies according to a distortion of an axle which is generated when the load applied to the vehicle is conducted to the axle. The calibration assisting program serves to assist the computer to function as a loaded data fetching means for fetching loaded data produced from the load sensor 10; a tire loaded data fetching means for fetching a tire loaded data produced from a mat scale (vehicle weight measuring device) for measuring a vehicle weight of the vehicle conducted through the tires 5 of the vehicle; a weight reduction detecting means for detecting a desired weight reduction in the vehicle weight in the vehicle weight measuring device 40 on the basis of the tire loaded data; a calibration information creating means for creating the calibration information for assisting the calibration on the basis of the loaded data fetched by the load data fetching means corresponding to the tire loaded data when the reduced weight is detected by the reduced weight detecting means and reference loaded data produced from the load sensor 10 when a previously stored desired reduced weigh is generated; and a calibration information outputting means for outputting the calibration information created by said calibration information creating means.

The relationship between the tire loaded data produced from the mat scale 40 and the load data produced from the sensor unit 10 corresponding to the tire loaded data can be exhibited on a graph shown in FIG. 8. In FIG. 8, the vertical axis represents loaded data (Hz) and the horizontal axis represents tire loaded data (ton).

In FIG. 8, the status when the mat scale 40 is 0 ton represents the state where the vehicle in an empty load state is placed on the mat scale 40. As the tire loaded data increases to 0.205, 0.410 and 0.610 (ton) successively, the load data varies to 35.7, 72.8 and 108.5 (Hz), respectively. On the other hand, as the tire loaded data decreases to −0.210, −0.415, and −0.610 (ton) successively, the loaded data varies to −36.9, −72.6, and −110.2 (Hz).

In this embodiment, the tire loaded data produced by the mat scale 40 when the tire 5 in the empty state is placed on the mat scale 40 is defined as 0 (ton). The operator can know a reduced quantity quickly. Incidentally, the tire loaded data may be an actually measured value.

The storage device 30d stores prescribed desired reduced quantities (−00.2, −0.4, −0.6) of the vehicle weight and the corresponding reference load data, which are correlated with each other on the basis of the graph shown in FIG. 8. The storage means serves as the reference load data storage means defined in claims. Storing the reference load data corresponding to the type of a vehicle, product number of the sensor unit 10, etc. enables more accurate calibration.

Now referring to the flowchart of FIG. 9, an explanation will be given of a first example of the processing performed by the CPU 30a of the calibrating assisting device 30.

In the state where the tire 5 is placed on each of the mat scales 40, the calibration assisting program stored in the storage device 30d is started by the CPU 30a. First, in step S11, whether or not a request has been received is determined on the basis of the input data from the entry unit 30e. If it is determined that the request has not been received (N in step S11), this determining step is repeated until the request is received. On the other hand, if it is determined that the request has been received (Y in step S11) the processing proceeds to step S12.

In step S12, it is determined whether or not the request thus received is an ending request. If it is determined that the request is the ending request (Y in step S12), the processing is ended. On the other hand, if it is determined that the request is not the ending request (N in step S12) it is determined whether or not the received request is a starting request for the front side. If it is determined that the request is the starting request for the front side (Y in step S13), the processing proceeds to step S14.

In step S14 (means for fetching tire loaded data), the tire loaded data is fetched as an initial value from the mat scale 5 on the front side into a RAM 30c through the I/O. The processing proceeds to step S15.

In step S15 (means for fetching tire loaded data), at a sampling time, like step S14, the tire loaded data on the front side is fetched into the RAM 30c as an initial value. The above initial value is subtracted from the tire loaded value fetched, and the result is stored in the RAM 30c as a reduced quantity on the front side. The reduced quantity data indicative of the reduced quantity is outputted on a display unit 30f so that the reduced quantity is displayed on the display unit 30f. The processing proceeds to step S16.

In step S16, it is determined whether or not the reduced quantity thus calculated has become a desired reduced quantity (e.g. 0.6 ton). If it is determined that the reduced quantity has not become the desired reduced quantity (N in step S16) the processing proceeds to step S15. This processing is repeated until the reduced quantity becomes the desired reduced quantity. On the other hand, it is determined that the reduced quantity has become the desired reduced quantity (Y in step S16). The processing proceeds to step S17.

In step S17 (load data fetching means), the load data produced from the sensor unit 10 corresponding to the mat scale 40 on which the tire 5 on the front side is placed is fetched into the RAM 30c and stored there. The processing returns to step S11.

In step S13, if it is determined that the request is not the starting request for the front side (N in step S13) in step S18, it is determined whether or not the request is a starting request for the rear side. If it is determined that the request is not the starting request on the rear side, the processing returns to step S11. A series of processing steps are repeated. On the other hand, in step S18, if it is determined that the request is the starting request (Y in step S18), the processing proceeds to step S19.

In step S19 (tire loaded data fetching means), the tire loaded data is fetched as an initial value from the mat scale 5 on the rear side into the RAM 30c through the I/O. The processing proceeds to step S20.

In step S20 (means for fetching tire loaded data), at a sampling time, like step S19, the tire loaded data on the rear side is fetched into the RAM 30c as an initial value. The above initial value is subtracted from the tire loaded value fetched, and the result is stored in the RAM 30c as a reduced quantity on the rear side. The reduced quantity data indicative of the reduced quantity is outputted on a display unit 30f so that the reduced quantity is displayed on the display unit 30f. The processing proceeds to step S21.

In step S21, like step S16, it is determined whether or not the reduced quantity thus calculated has become a desired reduced quantity. If it is determined that the reduced quantity has not become the desired reduced quantity (N in step S21), the processing proceeds to step S20. This processing is repeated until the reduced quantity becomes the desired reduced quantity. On the other hand, it is determined that the reduced quantity has become the desired reduced quantity (Y in step S21). The processing proceeds to step S22

In step S22 (load data fetching means), the load data produced from the sensor unit 10 corresponding to the mat scale 40 on which the tire 5 on the rear side is placed is fetched into the RAM 30c and stored there. The processing proceeds to step S23.

In step S23 (calibration information creating means) the reference load data corresponding to the reduced quantities on the front side and rear side stored in the RAM 30c are extracted from the storage device 30d. On the basis of the reference load data and the load data fetched into the RAM 30c, the calibration information is created in the RAM 30c. The processing proceeds to step S24.

Examples of the calibration information are the sensitivity data (amplification factor) corresponding to each sensor unit 10, reference load data, actual loaded data, etc. The calibration information may be various formats such as a combination of the reference load data and actually measured load data, only the sensitivity, etc.

In step S24 (calibration information outputting means), the calibration information thus created is supplied to the display unit 30f and displayed on the display unit 30f. The processing returns to step S11. A series of processing steps are repeated. Incidentally, the calibration information may be supplied to the weight meter 20 and sensor units 10 through the I/O unit 30g.

In this way, the CPU 30a in the calibration assisting device 30 according to the first embodiment of this invention serves as a load data extracting means, a tire loaded data extracting means, a reduced quantity detecting means, a calibration data creating means and a calibration information outputting means.

An explanation will be given of the operation of a first embodiment of a calibration assisting system 100 using the calibration assisting device 30 described above.

The motor vehicle on which the weight meter 20 to be calibrated is moved so that the tires 5 are placed on the mat scales 40, respectively. Then, the weight meter 20 and the mat scales 40 are connected to the calibration assisting device 30, and the calibration assisting device 30 is actuated. When an operator supplies a request of starting the calibration for the front side to the calibration assisting device 30, the calibration assisting device 30 fetches the tire loaded data from the mat scales 40 on the front side.

When the calibration assisting device 30 fetches the tire loaded data on the front side at each sampling time, the reduced quantity is displayed on the display unit 30f. Referring to the reduced quantity thus displayed, the operator jacks up the jack 50 until the reduced quantity becomes a desired quantity (e.g. 0.6 ton). When the reduced quantity becomes the desired quantity, the calibration assisting device 30 fetches the load data produced from the sensor units 10 on the front side through the weight meter 20.

Thereafter, when the operator supplies the request of starting the calibration for the rear side to the calibration assisting device 30, the calibration assisting device 30 fetches the tire loaded data from the mat scales 40 on the front side. When the calibration assisting device 30 fetches the tire loaded data on the rear side at each sampling time, the reduced quantity is displayed on the display unit 30f. Referring to the reduced quantity thus displayed, the operator jacks up the jack 50 until the reduced quantity becomes a desired quantity (e.g. 0.6 ton). When the reduced quantity becomes the desired quantity, the calibration assisting device 30 fetches the load data produced from the sensor units 10 on the rear side through the weight meter 20.

When the calibration assisting device 30 fetch the load data on the front and rear side, the reference load data corresponding to the desired reduced quantities are extracted from the storage device 30d. On the basis of the reference load data and the respective load data fetched into the RAM 30c, the calibration information is created and displayed on the display unit 30f. Referring to the calibration information thus displayed, the operator calibrates the weight meter 20.

As understood from the above description, with the reference load data of the sensor unit (load sensor) 10 corresponding to the desired reduced quantity in the mat scale (vehicle weight measuring device) 40 being stored in the storage device 30d, when a desired reduced quantity is detected on the basis of the tire loaded data fetched from the vehicle weight measuring device 40, on the basis of the load data produced from the load sensor and the corresponding reference load data, the calibration information for assisting the calibration of the weight meter is created. The operator reduces the vehicle weight conducted through the tire 5 placed on the vehicle weight measuring device using the jack 50. Then, a distortion on the axle 2 is produced opposite to the distortion of the axle 2 when the load applied to the vehicle is conducted to the axle 2. Therefore, the calibration information for the weight meter 20 based on the distortion can be obtained.

Thus, since it is not necessary to employ a weight when calibrating the weight meter 20, the calibration for the weight meter can be carried out in a short time, and the structure on which the weight is placed is not required.

With the tire placed on the mat scale (vehicle weight measuring device) 40, by reducing the vehicle weight conducted to the vehicle weight measuring device 40 to a desired reduced quantity using the jack (vehicle weight reducing means) 50, the calibration assisting device 30 creates the calibration information. Without requiring the structure for placing the weight on the vehicle, the operator can easily obtain the calibration information. Further, the facility configuration can be simplified as compared with the conventional facility using the weight. In this way, in accordance with the present invention, the calibration can be carried out at low cost in a short time. Since the calibration assisting device can be adopted by the customer for which the measuring accuracy of the weight meter 20 is not required so highly, the safety of the vehicle on which the weight meter is mounted can be further improved.

Embodiment 2

The basic configuration of each of the calibration assisting device 30 and calibration assisting system 100 according to the second embodiment is the same as that according to the first embodiment. In this embodiment, like reference numerals refer to like elements in the first embodiment.

In the first embodiment of the present invention, the mat scales 40 are connected to calibration assisting device 30, and the calibration assisting device 30 automatically detects the reduced quantities of the tire loaded data. As shown in FIG. 10, the calibration assisting device according to the second embodiment is different from that according to the first embodiment in that the mat scales 40 are not connected to the calibration assisting device 30. As a premise, a display unit for displaying the tire loaded data measured by the mat scale 40 is given. Such a calibration assisting system 100 thus realized permits a mat scale 40 commercially available or already possessed to be employed as it is.

In the second embodiment of the present invention, the calibration assisting device 30 has the same configuration as that shown in FIG. 7. The contents of the calibration assisting program file stored in the storage device 30*d* are different from those in the first embodiment.

The calibration assisting program contained in the calibration assisting program serves to assist the computer to function as a calibration assisting device 30 for assisting the calibration of a weight meter 20 for measuring the loaded weight of a vehicle produced from a load sensor on the basis of the load data varies according to a distortion of an axle which is generated when the load applied to the vehicle is conducted to the axle. The calibration assisting program serves to assist the computer to function as a loaded data fetching means 30*a*1 for fetching loaded data produced from the load sensor 10; a reduced quantity data fetching means for fetching a desired reduced quantity of the vehicle weight produced from a mat scales (vehicle weight measuring device) for measuring a vehicle weight of the vehicle conducted through the tires 5 of the vehicle; and a calibration information creating means for creating the calibration information for assisting the calibration on the basis of the loaded data fetched by the load data fetching means 30*a*1 and previously stored reference load data corresponding to the reduced quantity; and a calibration information outputting means for outputting the calibration information created by said calibration information creating means.

Now referring to the flowchart of FIG. 11, an explanation will be given of a second example of the processing performed by the CPU 30*a* of the calibrating assisting device 30.

The calibration assisting program stored in the storage device 30*d* is performed by the CPU 30*a*. First, in step S31, a reduced quantity inputting screen is displayed on the display unit 30*f*. The reduced quantity inputting screen urges to supply previously stored input screen information such as a reduced quantity data, identifying data for identifying the target to be examined, etc. The processing proceeds to step S32. Incidentally, on the reduced quantity inputting screen, a kind data of the vehicle, data for identifying the weight meter 20, etc. may be inputted.

In step S32, it is determined whether or not the reduced quantity has been inputted on the basis of the input data from the input unit 30*e*. If it is determined that the reduced quantity has been not inputted (N in step S32), this processing is repeated until the reduced quantity is inputted. On the other hand, if it is determined that the reduced quantity has been inputted (Y in step S32), the processing proceeds to step S33.

In step S33 (reduced quantity fetching means), the reduced quantity data indicative of the inputted reduced quantity is fetched. The reduced quantity data and the identifying data, which are correlated with each other, are stored in the RAM 30*c*. In step S34 (load data fetching means) the load data produced from the sensor unit 10 defined by the identifying data is fetched into the RAM 30*c* through the weight meter 20. The processing proceeds to step S35.

In step S35, on the basis of the load data fetched in the RAM 30*c*, it is detected whether or not the load data have been fetched from all the sensor units 10. If it is determined that the load data have not been fetched from all the sensor units 10 (N in step S35), the processing returns to step S31. On the other hand, if it is determined that the load data have been fetched from all the sensor units 10 (Y in step S35), the processing proceeds to step S36.

In step S36 (calibration information creating means), the reference load data corresponding to the reduced quantity represented by the inputted reduced quantity data is extracted from the storage device 30*d*. Like the first embodiment, on the basis of the reference load data and the respective load data fetched in the RAM 30*c*, the calibration information is created in the RAM 30*c*. The processing proceeds to step S37.

In step S37 (calibration information outputting means) the calibration information thus created is supplied to and displayed on the display unit 30*f*. The processing returns to step S11. The series of processing steps are repeated. Incidentally, the calibration information may be supplied to the weight meter 20 and sensor units 10 through the I/O unit 30*g*.

In the second embodiment described above, the CPU 30*a* of the calibration assisting device 30 serves as load data fetching means, calibration information creating means, calibration information outputting means and reduced quantity fetching means.

An explanation will be given of the operation of a second embodiment of a calibration assisting system 100 using the calibration assisting device 30 described above.

The motor vehicle on which the weight meter 20 to be calibrated is moved so that the tires 5 are placed on the mat scales 40. Referring to the display units of the mat scales 40, the operator jacks up the jack 50 so as to lift up the tires 5 on the front side until the tire loaded data becomes a desired quantity (e.g. 0.6 ton).

When the calibration assisting device 30 connected to the weight meter 20 is actuated and the reduced quantity and the corresponding identifying data of the sensor units on the front side are inputted on the reduced quantity inputting screen displayed on the display unit 30f, the calibration assisting device 30 fetches the load data from the sensor units 10 on the front side through the weight meter 20.

Upon completion of the front side, the operator releases the jack 50 on the front side and sets the jack 50 at the rear side. Like the front side, referring to the display units of the mat scales 40, the operator jacks up the jack 50 so as to lift up the tires 5 on the rear side until the tire loaded data becomes a desired quantity (e.g. 0.6 ton).

When the reduced quantity and the corresponding identifying data of the sensor units 10 on the rear side are inputted on the reduced quantity inputting screen displayed on the display unit 30f, the calibration assisting device 30 fetches the load data from the sensor units 10 on the front side through the weight meter 20.

When the calibration assisting device 30 fetches the load data from all the sensor units on the front side and rear side, the reference load data corresponding to the desired reduced quantity is extracted from the storage device 30d. On the basis of this reference load data and the respective load data fetched in the RAM 30c, the calibration information is created and displayed on the display unit 30f. In this way, referring to the displayed calibration information, the operator calibrates the weight meter 20.

As understood from the above description, with the reference load data of the sensor unit (load sensor) 10 corresponding to the desired reduced quantity in the mat scale (vehicle weight measuring device) 40 being stored in the storage device 30d, when the desired reduced quantity produced in the vehicle weight measuring device 40 is fetched into the calibration assisting device 30, on the basis of the load data produced from the load sensor and the corresponding reference load data, the calibration assisting device 30 creates the calibration information for assisting the calibration of the weight meter 20. The operator reduces the vehicle weight conducted through the tire 5 placed on the vehicle weight measuring device using the jack 50. Then, a distortion on the axle 2 is produced opposite to the distortion of the axle 2 when the load applied to the vehicle is conducted to the axle 2. Therefore, the calibration information for the weight meter 20 based on the distortion can be obtained. Thus, since it is not necessary to employ a weight when calibrating the weight meter 20, the calibration for the weight meter can be carried out in a short time.

With the tires placed on the mat scales (vehicle weight measuring devices) 40, by reducing the vehicle weight conducted to the vehicle weight measuring device 40 to a desired reduced quantity using the jack (vehicle weight reducing means) 50, the calibration assisting device 30 creates the calibration information. Without requiring the structure for placing the weight on the vehicle, the operator can easily obtain the calibration information. Further, the facility configuration can be simplified as compared with the conventional facility using the weight. In this way, in accordance with the present invention, the calibration can be carried out at low cost in a short time. Since the calibration assisting device can be adopted by the customer for which the measuring accuracy of the weight meter 20 is not required so highly, the safety of the vehicle on which the weight meter is mounted can be further improved.

In the first and second embodiments described above, the calibration information is displayed on the display unit 30f. The present invention should not be limited to such a configuration. The weight meter 20 and sensor units 10 may be provided with the calibrating function based on the calibration information. In this case, this calibration assisting device 30 supplies the calibration assisting information to the weight meter 20 and sensor units 10. The weight meter 20 and sensor units 10 automatically carry out the calibration.

What is claimed is:

1. A calibration assisting method for assisting the calibration of a weight meter for measuring the loaded weight of a vehicle on the basis of a load data produced from a load sensor, the weight meter measuring the loaded weight of a vehicle, the load data varying according to a distortion of an axle generated when the load applied to the vehicle is conducted to the axle, comprising the steps of:
   detecting a desired reduced quantity of a vehicle weight in a vehicle weight measuring device for measuring a vehicle weight which is conducted through tires of the vehicle;
   extracting the load data produced from the load sensor when the desired reduced quantity is detected;
   creating calibration information on the basis of the extracted load data and a reference load data produced from said load sensor when the desired reduced quantity is generated; and
   outputting the calibration information for assisting.

2. A calibration assisting device for assisting the calibration of a weight meter for measuring the loaded weight of a vehicle on the basis of a load data produced from a load sensor, the weight meter measuring the loaded weight of a vehicle, the load data varying according to a distortion of an axle generated when the load applied to the vehicle is conducted to the axle, comprising:
   a reference load data storage means for storing a reference load data produced from said load sensor when a desired reduced quantity of a vehicle weight is generated in a vehicle weight measuring device for measuring a vehicle weight which is conducted through tires of the vehicle;
   a load data fetching means for fetching the load data produced from the load sensor;
   a tire load data fetching means for fetching tire load data produced from the vehicle weight measuring device;
   a reduced quantity detecting means for detecting the desired reduced quantity of the vehicle weight;
   a calibration information creating means for creating information to assist the calibration on the basis of the load data corresponding to the tire load data and the reference load data stored in said reference load data storage means when the desired reduced quantity is detected by the reduced quantity detecting means; and
   a calibration information outputting means for outputting the calibration information created by said calibration information creating means.

3. A calibration assisting device for assisting the calibration of a weight meter for measuring the loaded weight of a vehicle on the basis of a load data produced from a load sensor, the weight meter measuring the loaded weight of a vehicle, the load data varying according to a distortion of an axle generated when the load applied to the vehicle is conducted to the axle, comprising:
- a reference load data storage means for storing a reference load data produced from said load sensor when a desired reduced quantity of a vehicle weight is generated in a vehicle weight measuring device for measuring a vehicle weight which is conducted through tires of the vehicle;
- a load data fetching means for fetching the load data produced from the load sensor;
- a reduced quantity data fetching means for fetching a reduced quantity data indicative of said desired reduced quantity produced by the vehicle weight measuring device;
- a calibration information creating means for creating the calibration information on the basis of the load data fetched by the load data fetching means corresponding to the reduced quantity data fetched by said reduced quantity fetching means and the reference load data stored in said reference load data storage means corresponding to the desired reduced quantity; and
- a calibration information outputting means for outputting the calibration information created by said calibration information creating means.

4. A calibration assisting system comprising:

the calibration assisting device according to claim 2;

said vehicle weight measuring device;

and a vehicle weight reducing means for reducing said vehicle weight which is conducted from the tire placed on said vehicle weight measuring means to said vehicle weight measuring means, wherein the reduced quantity detecting means of said calibration assisting device detects the desired quantity generated by said vehicle weight measuring device.

* * * * *